(12) United States Patent
Soria et al.

(10) Patent No.: US 6,616,842 B1
(45) Date of Patent: Sep. 9, 2003

(54) SHEET OF FILTRATION, SEPARATION OR REACTION ELEMENTS, AND A MODULE COMPRISING SUCH A SHEET

(75) Inventors: Raymond Soria, Bazet; Phillippe Chanaud, Tarbes, both of (FR)

(73) Assignee: Exekia, Bazet (FR)

( * ) Notice: Subject to any disclaimer, the term of this patent is extended or adjusted under 35 U.S.C. 154(b) by 0 days.

(21) Appl. No.: 09/506,591

(22) Filed: Feb. 18, 2000

(30) Foreign Application Priority Data

Feb. 19, 1999 (FR) .............................................. 99 02102

(51) Int. Cl.⁷ .............................................. B01D 29/50
(52) U.S. Cl. ...................... 210/323.1; 210/232; 55/482; 55/483; 55/484; 55/491; 55/492; 55/523
(58) Field of Search .............................. 210/232, 323.1, 210/323.2, 330; 55/482, 483, 484, 485, 491, 492, 523

(56) References Cited

U.S. PATENT DOCUMENTS

| | | | | |
|---|---|---|---|---|
| 2,576,864 A | | 11/1951 | Valente | |
| 2,709,525 A | * | 5/1955 | Beyer et al. | 210/184 |
| 4,237,010 A | * | 12/1980 | Zimmerly | 210/232 |
| 4,517,085 A | * | 5/1985 | Driscoll et al. | 210/232 |
| 5,171,341 A | * | 12/1992 | Merry | 55/484 |
| 5,174,969 A | * | 12/1992 | Fischer et al. | 422/180 |
| 5,293,742 A | * | 3/1994 | Gillingham et al. | 55/DIG. 30 |
| 5,733,452 A | * | 3/1998 | Whitlock | 210/497.01 |
| 5,908,480 A | * | 6/1999 | Ban et al. | 55/482 |
| 6,007,718 A | * | 12/1999 | Booth | 210/232 |

FOREIGN PATENT DOCUMENTS

| | | |
|---|---|---|
| EP | 0 025 349 A | 3/1981 |
| EP | 0 253 620 A | 1/1988 |
| EP | 0 556 932 A | 8/1993 |
| FR | 344 377 | 11/1904 |
| WO | WO 96/06510 A | 3/1995 |

* cited by examiner

Primary Examiner—John Kim
(74) Attorney, Agent, or Firm—Birch, Stewart, Kolasch & Birch, LLP

(57) ABSTRACT

There are provided a sheet of filtration, separation or reaction elements, a method for preparing such a sheet, a filtration, separation or reaction module comprising at least one such sheet, and a method for preparing this module.

23 Claims, 1 Drawing Sheet

Inter-elements linkage unit (LU)

Filtration Element

SHEET OF FILTRATION, SEPARATION OR REACTION ELEMENTS, AND A MODULE COMPRISING SUCH A SHEET

BACKGROUND OF THE INVENTION

The present invention relates to a novel type of assembly of single- or multi-channel elements. The invention applies to filtration, separation or the bringing of liquid or gaseous fluids into contact and for example, to microfiltration, ultrafiltration, nanofiltration, pervaporation, reverse osmosis, and can apply to (bio)membrane reactors, to gas diffusers, to liquid or gas/liquid or gas contactors, or to catalysis, or to fuel cells.

Several types of single- or multi-channel (filtering) element assemblies are already known.

The elements can firstly be arranged individually in a casing and then occupy predetermined positions. The element is held in place by two support points located at the ends of the part. Depending on the length of the single- or multi-channel element, the distance between these two points of support can be significant. The disadvantage of this system resides in this distance between the two points of support which make it obligatory to use elements which can withstand significant mechanical stresses. This first type is generally employed falls single- or multi-channel ceramic membranes well suited to withstanding mechanical stresses.

In order to reduce the distance between the points of support, one or several bracing members or distance pieces can be employed. These are intended to improve mechanical strength of the set of elements. The bracing members are located perpendicularly to the length of the elements. The bracing members have holes which are used to position the elements and, like in the case above, each element occupies a well defined position. The use of bracing members makes it possible to improve mechanical strength but creates enormous disadvantages arising from the pre-defined positions of the elements in the assembly. Firstly, any deviation from straightness along the length of the elements proves to be a problem at each bracing member. Then, problems of industrial implementation are present. Indeed, it is very difficult to assemble a large number of elements as this involves sliding the elements one by one through the different holes of the bracing members. Additionally, assembling the filtering elements one by one is difficult with fragile filtering elements. The only filter modules currently known using bracing members are modules employing carbon membranes which have been reinforced with fibers arranged on the outside of the membranes. In the case of fragile filtering elements, it is impossible to insert, in practical terms, a large number of elements into a bracing member. Another disadvantage of this system of assembly originates from the barrier created by these bracing members which disturbs the flow of fluid which has been treated or is to be treated.

In one embodiment generally applied to organic fibers, the elements can be arranged in the form of a sheaf or bundle. These elements are then joined at the end by a potting operation. This bundle represents a cartridge which is then positioned inside the casing. Unlike the cases above, the elements do not have well defined positions but the complete bundle occupies a given space. If this bundle which is employed with organic membranes satisfies the constraints for industrial implementation (at the manufacturing stage), it in no way improves the mechanical withstand strength of the membranes. The distance between the points of support is in effect too large in the case of single- or multi-channel elements which are mechanically fragile. In this case of organic fibers, they are frequently reinforced at their "foot", in other words at the bond between the fiber and the potting compound. This is possible since the organic fiber is made from a polymer which can be reinforced with another polymer which is stronger or harder, such as for example with a thermoplastic polyurethane (TPU). The solution can however not be transposed to filtering elements which are more fragile such as those of ceramic, as there is no material in existence able to fulfil the function played by the TPU above. Additionally, in this system of assembly the space between the filtering elements is not determined. This lack of determination has a negative effect on the flow of fluid to be treated or which has already been treated and limits the performance of the assembly in the form of a bundle.

None of the assembly systems of the prior art is perfectly suited to the assembly of a large number of single- or multi-channel mechanically-fragile filtering elements. None of the cases cited above neither teaches nor suggests the present invention, suited to mechanically-fragile elements, and providing a solution for overcoming the various disadvantages discussed above.

SUMMARY OF THE INVENTION

The invention provides a novel type of assembly of elements for filtration, separation or reaction, applicable to any type of element (whether single- or multi-channel), notably those which are mechanically fragile, an assembly in which said elements are linked together in order to form a sheet of elements.

The invention consequently provides a sheet of elements for filtration, separation or reaction, in which the elements are joined together by inter-element linkages.

According to one embodiment, the sheet exhibits the three following dimensionless numbers:

A: Number of inter-element linkages per filtering element comprised between 1 and 20, E: Number of filtering elements per inter-element linkage comprised between 2 and 2000, N: Total number of filtering elements comprised between 10 and 2000.

According to one embodiment of the sheet:

A is comprised between 2 and 5;

E is comprised between 3 and 700;

N is comprised between 10 and 300.

According to one embodiment of the sheet, the elements are directly linked to 4 other elements at the most.

According to one embodiment, the inter-element linkages are constituted by linking units joining the elements together and connected to the latter by fastening means.

According to one embodiment, in the sheet, the linking units connect the elements pairwise.

In one embodiment, the inter-element linkages are linear.

In another embodiment, the inter-element linkages are branched.

The inter-element linkages can make, with respect to the axis of the elements, an angle of 30 to 150°, preferably between 60 and 120°.

According to one embodiment, the inter-element linkages are in elastomer and/or thermoplastic polymer.

In one embodiment, the inter-element linkages are in ceramic cement.

In a further embodiment, the inter-element linkages are attached to the elements by mechanical and/or physico-chemical means.

The inter-element linkages and the fasting means can be made of the same material.

The elements can be single- or multi-channel elements.

According to one embodiment, said elements are ceramic fibers.

According to one embodiment, said sheet is rigid.

According to another embodiment, said sheet is flexible.

In a further embodiment, said sheet is flat.

The invention also provides a method for preparing a sheet comprising the steps of:
(i) placing the filtering elements on a suitable support;
(ii) linking said elements by means of inter-element linkages.

Step (ii) can comprise a first sub-step comprising applying an inter-element linkage precursor and a second sub-step comprising transforming said precursor into said linkage.

The method for preparing a sheet can comprise the steps of:
(i) arranging an inter-element linkage precursor on a suitable support;
(ii) arranging the filtering elements on said precursor;
(iii) connecting said elements to said inter-element linkages by transforming said precursor into said linkage.

According to one embodiment of the method, the transformation of said precursor is carried out by polymerization.

The invention also provides a filtration, separation or reaction module comprising at least one sheet according to the invention.

This module can comprise two end ottings in epoxy, with said inter-element linkages being in elastomer and/or thermoplastic polymer.

In another embodiment, it comprises two end pottings in ceramic cement with inter-element linkages in elastomer and/or thermoplastic polymer.

In a further embodiment, the module comprises two end pottings in ceramic cement, with the inter-element linkages in ceramic cement.

The module can comprise at least two sheets placed one above the other.

In a further embodiment, the module comprises at least one wound sheet.

The invention also provides a method for preparing a module according to the invention, comprising the steps of:
(i) preparing at least two sheets by the method according to the invention;
(ii) placing these sheets one above the other; and
(iii) potting the ends thereof.

The method for preparing a module can comprise the steps of:
(i) preparing at least two sheets by a method according to the invention;
(ii) applying, to at least one of said sheets, an inter-element linkage precursor and placing said at least one second sheet thereover;
(iii) transforming said precursor into an inter-element linkage; and
(iv) potting the ends thereof.

The method for preparing a module can also comprise the steps of:
(i) preparing at least one sheet by the method according to the invention;
(ii) winding said sheet or sheets about itself or themselves; and
(iii) potting the ends thereof.

The method for preparing a module can also comprise the steps of:
(i) preparing a sheet by the method according to the invention;
(ii) applying to said sheet an inter-element linkage precursor;
(iii) winding said sheet about itself;
(iv) transforming said precursor into an inter-element linkage; and
(v) potting the ends thereof.

The method for preparing a module can also comprise the steps of:
(i) preparing at least two sheets by the method of the invention;
(ii) applying, to at least one of said sheets, an inter-element linkage precursor;
(iii) winding said sheets about themselves;
(iv) transforming said precursor into an inter-element linkage; and
(v) potting the ends thereof.

The invention will be described in a more detailed fashion below with reference to the attached drawings.

DETAILED DESCRIPTION

Figure 1:
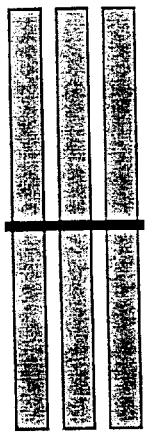
FIG. 1 shows three filtration elements joined together by continuous inter-element linkages located on the same side with respect to all three filtration elements.

In the framework of this invention, the description refers to "filtering" elements but such elements can also be used for any of the applications mentioned above in the introduction and the invention should in no manner be limited just to filtration. The invention applies to any type of element for filtration, separation, reaction, bringing two fluids into contact, etc, as indicated above.

Sheet

The sheet of filtering elements is best characterised by three dimensionless numbers:

A: Number of inter-element linkages per filtering element.

B: Number of filtering elements per inter-element linkage.

N: Total number of filtering elements.

The invention provides a new concept of filtering element sheet, formed by filtering elements and by an inter-element linkage system, improving mechanics and having new advantages. This inter-element linkage makes it possible to connect the filtering elements together, said linkage consisting in general of a plurality of linking units fastened to the elements by fastening means. These linking units generally connect one element to another; it is however possible for such a unit to connect several elements together. This combination of filtering elements and their inter-element linkages constitutes a novel unit which we call the "sheet", offering new possibilities for mounting filtering elements. The sheet according to the invention is characterised by the fact that the elements are not all linked together to the same linking unit, as is the case in the conventional system with bracing elements or distance pieces, in which the elements are connected together by a linkage comprising a single linking unit (constituted by the bracing member). When compared to this same system with a bracing member, the invention provides a sheet having a distinctly lower branching factor. Whereas in a bracing member, each element is linked to all the others, in the present sheet, the elements are generally linked pairwise. One can also say that in the sheet according to the invention, the branching factor is relatively low compared to that for a bracing member. The branching factor can be defined as a mean value of the number of elements directly linked to a given element, in other words the mean number of first order neighbors of each element. Thus, in the case of the bracing member, considering a total number of elements equal to 10, each element will be directly linked to the nine others. Each element consequently has 9 first order elements and the branching factor is nine. In the case of the sheet of the invention, this factor is in general lower than 4, preferably lower than 3.

This sheet has a synergy effect which improves, in a remarkable manner, the mechanical strength of the filtering elements in the final assembly (or module). This synergic effect is partly, and notably, associated with the number of inter-element linkages per filtering element, A.

The sheet makes it possible to control the space between the filtering elements in the final assembly. Compared to bundle or bracing member systems, this controled space thus created makes it possible to improve the flow of fluid to be treated or fluid which has already been treated. The spacing is partly, and notably, associated with the above "E" value.

The sheet also makes it possible to facilitate the placing of a junction or potting at the ends of the filtering elements, using the spacing created.

Compared to braced and other systems of the prior art, this sheet system simplifies industrial implementation as there is now no longer the need to slide the elements through holes in the bracing member. Additionally, the sheet according to the invention obviates resonance phenomena which conventionally occur in the case of bracing members, as the links thus created in the sheet make it possible to distribute vibrations from one element over the others. The inter-element linkages make it possible to distribute stresses over the complete final assembly in the final unit (for example the filter unit). Finally, permeate-side fluid flow is greatly improved, as there is now no longer a barrier impeding such flow.

The sheet comprises single- or multi-channel filtering elements connected by inter-element linkages. The inter-element linkages are provided using linking units, attached to the filtering elements by fastening means. The number E makes it possible to define the number of filtering elements that are common to a given linkage. These linking units maintain the filtering elements by means of a fastening means system. The number A makes it possible to define the number of linkages (or fastening means) carried by a given filtering element. The arrangement and number of two- or three-dimensional linkages on the filtering elements make it possible to provide the complete sheet with the various properties and notably mechanical synergy properties. The various parts of the sheet are described below.

Inter-Element Linkages

Figure 2:
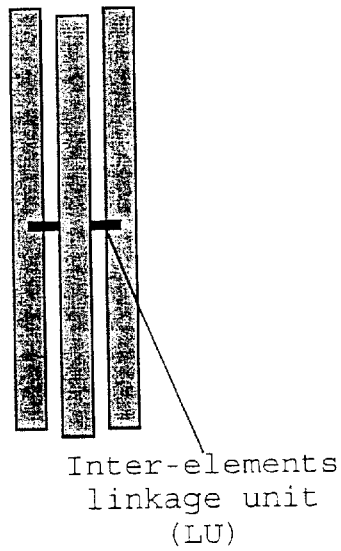
FIG. 2 shows three filtration elements joined together by continuous inter-element linkages, wherein two filtration elements are located on one side thereof and the third filtration element is located on the opposite side thereof.
Figure 3:
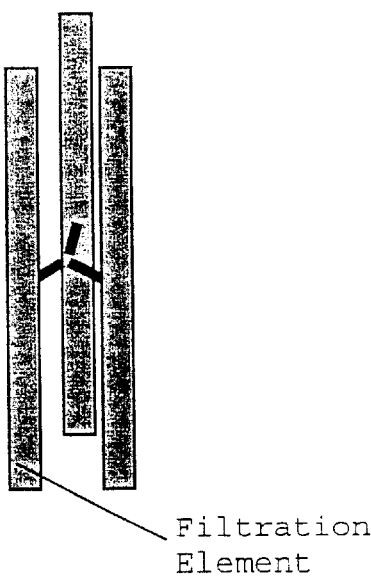
FIG. 3 shows three filtration elements joined together by a branching inter-element linkage having a three-pronged star shape.
Figure 4:
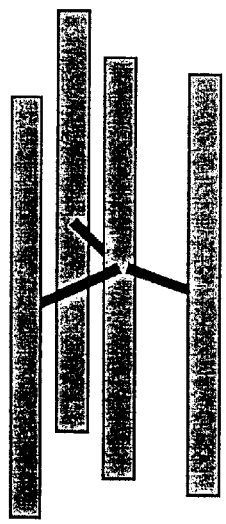
FIG. 4 shows three filtration elements joined to a fourth filtration element by three inter-element linkages each of which emanates from the fourth filtration element.

The sheet comprises the filtering elements joined together by inter-element linkages which join the filtering elements pairwise in a continuous or branching fashion. FIG. 1 shows three filtration elements joined together by continuous inter-element linkages located on the same side with respect to all three filtration elements. FIG. 2 shows three filtration elements joined together by continuous inter-element linkages, wherein two filtration elements are located on one side thereof and the third filtration element is located on the opposite side thereof. FIG. 3 shows three filtration elements joined together by a branching inter-element linkage having a three-pronged star shape. FIG. 4 shows three filtration elements joined to a fourth filtration element by three inter-element linkages each of which emanates from the fourth filtration element. In the case of branching, one element is generally linked directly to a maximum of four other elements, preferably three other elements at the most.

This linkage may not be common to all the elements, but each filtering elements constitutes at least part of one inter-element linkage.

The number E corresponds to the number of filtering elements linked by a given inter-element linkage. This value is not necessarily constant from one element to the next in the sheet (and, generally, it is in fact variable). This number E is generally comprised between 2 and 2000 and more, particularly between 3 and 700.

The linking units and their fastening means, forming the inter-element linkages are arranged so as to provide cohesion, synergy and anti-vibration properties to the assembly of elements in the final module (to the description of which reference can now be made). Each filtering element is maintained by a certain number of inter-element linkages, the fastening means of which are arranged over its length. These various linkages make it possible to decrease the lengths between successive points of support. Thus, when under mechanical stress, this linkage system makes it possible to reduce deformation of the filtering elements thereby reducing the danger of breakage.

The elements are connected to each other by the linking units and the fastening means, which makes it possible to create a synergic effect. In effect, a stress applied to one filtering element is retransmitted also to neighboring filtering elements which are connected by the same linking unit, and so on. As the elements are globally all joined together, this stress is consequently re-transmitted and dissipated over the complete assembly.

Depending on how long and fragile the filtering elements are, one or several fastening means and linking unit(s) are positioned per element. When a stress is applied to the middle of the filtering elements which is fastened at its ends, the latter bends and becomes deformed. The amplitude of deformation increases as the stress increases and, beyond a certain value, the element will break. By way of example, in the case of a distance between supports of 860 mm, breakage of a ceramic element of 5 mm diameter can be obtained by exercising a 5 N force at its mid-point. In the case of a fragile element such as, for example, a ceramic fiber, it is advantageous to decrease the distance between the two points of support, thereby increasing the maximum admissible stress and, overall, the filtering element will be better able to withstand higher stresses.

Spacing of these various fastening means and linking units on a given filtering element also determines how the complete assembly will behave mechanically. Thus, it is preferable to have regular spacing of the various fastening means and linking units over the length of the filtering elements, in preference to arranging a group of fastening means and linking units over a portion of the length thereof. The spacing of the fastening means and linking units makes it possible to reduce the distance between the points of support and consequently to increase the admissible level of stress.

Preferably, although this is in no way limiting, one can use three linkages for joining the filtering elements, these linkages being distributed substantially uniformly over the length of the filtering unit. By way of example, in the case of 850 mm long ceramic fibers, these three linkage units and fastening means will be located at 180 mm, 425 mm and 670 mm from one of the ends of the the ceramic fiber.

These linkages make it also possible to avoid propagation of vibrations. For this, the fastening means and linking units can be positioned at favorable points of support so as to minimise the propagation of vibrations from the filtering element, as well as at the center of the filtering element.

In fact, the number A, the number of linkages (linking units plus fastening means) per element is a function of the mechanical and vibration-withstand strength of an element taken individually as well as of the assembly. The higher the value of A, the greater the mechanical resistance the assembly will have. The number A is generally comprised between 1 and 20 and, more preferably, between 2 and 5.

The inter-element linkages (linking unit plus fastening means) generally make an angle of between 30 and 150° with respect to the axis of the filtering element and, preferably, between 60 and 120°. This angle can be 90° when for example, the sheet of filtering elements is designed to be rolled to form the module. In this same case, this angle can also be different from 90°, in order to vary the degree of compactness of the final module.

As has been indicated, linkages comprise the linking units and fastening means.

Fastening means

The system for fastening the linking units to the filtering elements can be provided in varying manners. The fastening means can be physico-chemical or mechanical or a combination of these various types or, yet again, the fastening means can correspond to a positioning of the linking units.

One example of a mechanical fastening means is the use of clips for the linking units. The shape of the clips is then adapted to the outside shape of the filtering elements. In this case, the linking units can be a fixed conventionally on the the material constituting the clips. The use of the clips makes it possible to position the filtering elements and to provide a 2- or 3-dimensional sheet. A further example can be given by the use of a material which penetrates into the porosity of the filtering elements. In this latter case, one or two materials can be employed; the first ensures keying at the filtering elements and the same material, or another material, provides the linking unit.

In the case of physico-chemical fastening means, the linking units are positioned by bonding, welding or sintering the material constituting the linking units to the filtering elements. For example, it is possible to bond the linking units to filtering elements in ceramic material using an epoxy type resin.

Linking unit

All types of polymer material, with or without filler, or mixtures of polymer materials of, for example, the elastomer, thermoplastic or thermo-setting type are suitable. This material can also be a metallic, ceramic, or organo-mineral composite, or a composite material.

By way of example, and not exhaustively, we can mention the following polymers: EPDM, EPR, fluorinated silicone, poly(meth) acrylate, fluorocarbon polymer, polyphosphazene, polyvinyl- or phenyl-silicone, polyolefins such as polypropylene or polyethylene.

Any other rigid or elastic material that is compatible with the materials and fluids encountered can however be used.

Filtering, separation or reaction element

A single- or multi-channel filtering element can firstly be an element having an elongated shape the having a geometry such that its cross section, perpendicular to the axis of its channel(s) is constant or variable. The shape of this cross-section is circular, polygonal (for example hexagonal) or any other shape for example a star- or multi-lobed shape). This cross-section includes one or several holes which themselves are also of a circular, polygonal or any other shape. In the simplest case, this element has a particular shaping and corresponds to a single-channel cylindrical element having a circular profile through which a single circular hole extends, in other words this is a straight tube. A preferred element is the fiber.

The filtering element can be composed of sintered ceramic, sintered metal, porous carbon, composite material, or organo-mineral composite or organic material. The material constituting it can be porous or dense. The following cases can be mentioned:

porous monolithic elements, one example being porous filtering fibers;

asymmetrical porous structure elements, for example elements comprising a stack of variable porosity layers. Another example consists of elements having a porosity that varies radially such as those produced by centrifuge processes;

elements combining porous portions and dense portions. One example can be porous carriers containing dense internal or external layers;

dense elements such as for example those employed for manufacturing fuel cells or oxygen separators.

Sheet preparation process

The process comprises firstly positioning the elements on a suitable support. One example that can be given is a toothed belt or a net. In this case, the filtering elements can be positioned in the notches of the toothed belt type strip or in the spaces of the net.

In a second step, the inter-element linkages are put into place. One can for example apply a polymer precursor which is then polymerized, thereby forming the linking unit fastened by physico-chemical attachment.

Module

One point of major interest in the invention lies in the possibilities of use of these sheet-form filtering element assemblies. In effect, these sheets are designed for mounting as a unit, notably for filtration. For this, they could be used as such, notably in the case of 3-dimensional sheets (with a branching factor of for example 4), or be rolled or arranged one on top of the other in the case of flat sheets. The rolled sheets or those placed one on top of the other can be such that the elements are or are not mutually parallel; for example, in the case of a rolled sheet, the filtering elements can be mutually parallel or, on the contrary, have a twisted configuration.

The sheets according to the invention can be rigid or flexible depending on the final module that is to be produced.

Useful results can be obtained for modules comprising:

two epoxy end pottings and inter-element linkages in elastomer polymer and/or thermoplastic polymer for applications at ambient temperature;

two end pottings in ceramic cement and inter-element linkages in elastomer and/or thermoplastic polymer, for applications at a temperature of around 250° C. maximum;

two end pottings in ceramic cement and inter-element linkages in ceramic cement, for applications at a temperature up to around 500° C.

Final spacing of the filtering elements in the filtering unit is controlled by the spacing at sheet level. For example, one can produce a flat sheet with carefully selected spacing. When this sheet is wound, this makes it possible to automatically align the filtering elements into a compact spiral or even a hexagonal or triangular stack. In the case of one or several rolled sheets, the linkages may not be perpendicular to the elements. When the sheets are wound, this will have the effect of offsetting the linkages which, consequently, will come to occupy a more restricted space in the final module. Such an arrangement is also useful for improving permeate-side flow.

Similarly, several flat sheets can be arranged one above the other in order to obtain a 3-dimensional assembly. The spacing of the filtering elements then allows a staggered or quincunx-arrangement stacking, or arrangement of the filtering elements one above the other. Similarly to the above, it can be advantageous to employ sheets the linkages of which are offset from one sheet to the next.

Method for preparing modules

The module according to the invention can be prepared in the form of numerous embodiments.

In the case of modules comprising sheets placed one above the other, the process can comprise simply placing these sheets one on top of the other and then potting the extremities. This process could also comprise an intermediate or preliminary step in which an inter-element linkage precursor is applied between the sheets for transformation into inter-element linkages. Such a transformation is notably achieved by polymerization, in particular by polymerization under heat.

In the case of modules comprising rolled sheets, the process can simply comprise rolling the sheet or sheets about themselves and potting the ends. This process can also comprise the intermediate step of applying an inter-element linkage precursor, either on a single layer or between layers, for transformation into inter-element linkages.

The invention is not limited to the embodiments described but may be subject to numerous variations readily accessible to those skilled in the art.

What is claimed is:

1. A sheet of elements for filtration, separation, or reaction, wherein said elements are joined together by inter-element linkages making, with respect to the axis of the elements, an angle of 30 to 150°, and wherein each of said elements is directly linked to at most 4 other elements, the sheet of elements exhibiting the three following dimensionless numbers:

A, a number of inter-element linkages per filtering element, comprised between 1 and 20;

E, a number of filtering elements per inter-element linkage, comprised between 2 and 2000; and N, a total number of filtering elements, comprised between 10 and 2000.

2. The sheet of elements of claim 1, in which:

A is comprised between 2 and 5; E is comprised between 3 and 700; and N is comprised between 10 and 300.

3. The sheet of elements of claim 1, in which the branching factor is lower than 3.

4. The sheet of elements of claim 1, in which the inter-element linkages are constituted by linking units joining the elements together and connected to the latter by fastening means.

5. The sheet of elements of claim 1, in which the linking units connect the elements pairwise.

6. The sheet of elements of claim 1, in which said inter-element linkages are linear.

7. The sheet of elements of claim 1, in which the inter-element linkages are branched.

8. The sheet of elements of claim 1, in which the inter-element linkages make, with respect to the axis of the elements, an angle between 60 and 120°.

9. The sheet of elements of claim 1, in which the inter-element linkages are composed of elastomer and/or thermoplastic polymer.

10. The sheet of elements of claim 1, in which the inter-element linkages are composed of ceramic cement.

11. The sheet of elements of claim 1, in which the inter-element linkages are attached to said elements by mechanical and/or physico-chemical means.

12. The sheet of elements of claim 4, in which the inter-element linkages and the fastening means are made of the same material.

13. The sheet of elements of claim 1, in which said elements are single-channel or multi-channel elements.

14. The sheet of elements of claim 1, in which said element s are ceramic fibers.

15. The sheet of elements of claim 1, wherein said sheet is rigid.

16. The sheet of elements of claim 1, wherein said sheet is flexible.

17. The sheet of elements of claim 1, wherein said sheet is flat.

18. A filtration, separation or reaction module comprising at least one sheet according to claim 1.

19. The module of claim 18, comprising two end pottings composed of epoxy, with said inter-element linkages being composed of elastomer and/or thermoplastic polymer.

20. The module of claim 18, comprising two end pottings composed of ceramic cement with inter-element linkages composed of elastomer and/or thermoplastic polymer.

21. The module of claim 18, comprising two end pottings composed of ceramic cement, with the inter-element linkages also composed of ceramic cement.

22. The module of claim 18, comprising at least two sheets placed one above the other.

23. The module of claim 18, comprising at least one wound sheet.

* * * * *